United States Patent

Chandler et al.

[11] Patent Number: 6,156,929
[45] Date of Patent: Dec. 5, 2000

[54] BIODEGRADABLE FILM

[75] Inventors: Christophe Chandler, Woodbury; Boris A. Miksic, North Oaks; Arthur H. Ahlbrecht, Stillwater; Jude Currier, Maplewood, all of Minn.

[73] Assignee: Cortec Corporation, St. Paul, Minn.

[21] Appl. No.: 09/483,482

[22] Filed: Jan. 14, 2000

Related U.S. Application Data

[63] Continuation-in-part of application No. 09/164,887, Oct. 1, 1998, Pat. No. 6,028,160.

[51] Int. Cl.[7] .................................................. C07C 59/245
[52] U.S. Cl. ......................... 562/582; 562/590; 562/594; 562/535; 528/176
[58] Field of Search ................................ 562/582, 590, 562/594; 260/535

[56] References Cited

U.S. PATENT DOCUMENTS 4,132,735  1/1979  Lamberti et al. ....................... 562/582

*Primary Examiner*—Terressa M. Boykin
*Attorney, Agent, or Firm*—Haugen Law Firm PLLP

[57] ABSTRACT

Biodegradable resin products consisting essentially of a polymeric resin of starch, polyesters of polylactic acid and polycaprolactone. In admixture with the resin is a particulate vapor phase corrosion inhibitor selected from amine salts, ammonium benzoate, triazole derivatives, tall oil imidazolines, alkali metal molybdates, alkali dibasic acid salts, and mixtures thereof, and is present in an amount ranging from between about 1% and 3% by weight of the polymeric resin.

9 Claims, No Drawings

BIODEGRADABLE FILM

CROSS-REFERENCE TO RELATED APPLICATION

This application is a continuation-in-part of the application filed Oct. 1, 1998, Ser. No. 09/164,887, U.S. Pat. No. 6,028,160 entitled BIODEGRADABLE VAPOR CORROSION INHIBITOR PRODUCTS.

BACKGROUND OF THE INVENTION

This continuation-in-part describes polyester resin films that incorporate vapor corrosion inhibitors and meet the recently approved compostable plastics standard of ASTM, D5338 dated Apr. 10, 1999. Films are also described that will meet the proposed CEN draft standards made public Dec. 8, 1998, as PREN 13427.

The present invention relates generally to an improved, more environmental friendly resinous product particularly useful in packaging and/or packing applications. The product incorporates the features of biodegradability together with the incorporation of a vapor phase corrosion inhibitor for protection of metallic surfaces positioned in proximity to the material, such as for example, when held or contained within an enclosure prepared from the product as a film or shroud. Plastic films and packing materials formed of raw materials which are biodegradable are commercially available, and because of their more environmental friendly properties, they are becoming more and more in demand. For example, plastic resin films have a wide variety of uses, including forming enclosures such as shipping sacks for creating a protective environment for metallic articles. Additionally, resinous products may be prepared from other base materials, with such articles having found specific application as bulk packing dividers or filler objects useful in a variety of packaging applications. While conventional films or objects fabricated from polyolefin resins have found wide application for packaging purposes, the need for resin products which are biodegradable and compostable is both recognized and for a variety of applications, is becoming a requirement. Because of their different physical properties, however, these products prepared from biodegradable materials possess some disadvantageous characteristics or properties which may be overcome through utilization of the features of the present invention.

Biodegradable plastic films or objects have certain physical and mechanical properties which differ from those of the conventional and well-known polyolefin films such as polyethylene and polypropylene. For example, the commercially available biodegradable films have significantly higher breathability and moisture attraction and permeability. Because of these physical properties, biodegradable plastic films typically offer less protection to metallic articles than is available from the more traditional polyolefin films. However, this disadvantage may be overcome when the biodegradable plastic resin film is combined with a particulate vapor phase corrosion inhibitor dispersed within and through the film or coated on the surface of the film. The selected vapor phase corrosion inhibitors used in connection with the present invention are highly compatible with biodegradable resins and films, and offer significant protection to metallic articles within an enclosure. In particular, those films comprising a film forming resin selected from the group consisting of a polylactic acid homopolymer, a polycaprolactone polymer or other suitable polyesters including those prepared with adipic acid, succinic acid, and butanediol. Films comprising these resins in either their pure or blended form possess the property of biodegradability along with higher permeability and higher breathability when compared to those same properties exhibited by conventional polyolefin films.

In the formation of enclosures or shrouds for metallic articles, certain applications find the higher permeability and breathability to be an advantage. Such applications include enclosures for high humidity environments to avoid "greenhouse" effects. To offset the greater permeability and accessibility of the enclosure to corrosive atmospheres rich in water vapor, salt air, carbon dioxide, sulfur dioxide, hydrogen sulfide, or other gases which pose a threat to the surfaces of metallic objects, a vapor phase corrosion inhibitor in films of the type selected for this invention will provide significant protection for metallic articles, as well as other advantages.

The selected vapor phase and contact corrosion inhibitors which have been found highly effective for use in connection with the present invention are amine salts, ammonium benzoate, alkali molybdates, alkali nitrites, alkali dibasic acid salts, tall oil imidazolines, and triazole compounds. These materials have been found to have highly effective corrosion inhibiting properties when combined with or coated on films in accordance with the present invention. The corrosion inhibitors are preferably prepared and available in particulate form with particles being of a preferred size range. For most film applications, the corrosion inhibitors found most useful have a maximum particle size range less than about 50 microns, with a size of between about 20 and 30 microns being preferred.

When a film substrate has served its intended purpose and is to be discarded, it is becoming more and more important that the composition from which the film is formed be biodegradable and compostable. Indeed, certain legislation has been proposed which would ban the disposal of bags fabricated from non-biodegradable plastic film from compost heaps or piles. In this connection, standards have been adopted for classifying film bags as compostable and biodegradable, with this standard normally providing that no more than 10% of the film's original weight can remain on a ⅜th-inch screen following 12 weeks of exposure to a compost medium. Resin films prepared from a polymer resin selected from the group consisting of polylactic acid homopolymer, polyesters of butanediol, adipic acid, succinic acid, and small amounts of terephthalic acid and/or polycaprolactone meet these standards and can be blended with starch derivatives for some applications as a means of reducing the cost or enhancing biodegradability. The biodegradable properties and characteristics of these films are not adversely affected when blended with one or more of the particulate corrosion inhibitors as set forth hereinabove.

Turning now to the biodegradable film substrates, a lactic acid homopolymer is commercially available from Cargill, Inc. of Minnetonka, Minn. under the trade designation "Ecopla 4200-D", with this homopolymer being useful in the production of biodegradable films. Additionally, materials available from Mitsui Chemicals Inc. of Japan under the trade designation "Lacea" may be used. A biodegradable film forming resin available from BASF of Parsippany, N.J. under the trade designation "Ecoflex" is useful for forming film products. Polyester polymers prepared from polycaprolactone are commercially available from Union Carbide under the trade designations "TONE", and "EASTAR" is commercially available from Eastman Chemical. "Bionolle", a polyester available commercially from Showa Denko of Japan, is particularly useful as a film, a foam, or a non-woven sheet that can be coated or extruded in contact with corrosion inhibiting chemicals. Each of these resins may be compounded with the selected vapor and contact corrosion inhibitor chemicals or formulations to produce films capable of enhanced corrosion protection to the surfaces of packaged metallic articles. At the same time, when these films have served their useful purpose, they may be discarded as biodegradable materials to be received in conventional composting fields.

It is recognized that biodegradable films are more environmentally friendly, since the degradation of the film renders it more acceptable for use in situations where composting occurs. In accordance with the present invention, biodegradable films may be utilized in applications when the films are combined with the corrosion inhibitors of the type selected for use in connection with the present invention.

SUMMARY OF THE INVENTION

In accordance with the present invention, the corrosion inhibitors preferred for use in combination with films or cushion packaging resins are selected from the group consisting of amine salts, ammonium benzoate, alkali metal molybdates, alkali nitrites, alkali dibasic acid salts, triazole compounds, and mixtures thereof. These corrosion inhibiting materials are especially useful in serving to protect surfaces of most metallic articles, with the triazole component being particularly useful in protecting copper against corrosion. In a typical production application, the selected corrosion inhibitors may be blended with the selected resin in relatively high percentages, such as between 10% and 20% to produce a masterbatch. This concentrated masterbatch formulation may then be further blended with film forming resins to produce a final blend suitable for ultimate extrusion as a film product, preferably containing between 1% and 3% of the vapor and contact corrosion inhibiting component within the film.

Therefore, it is a primary object of the present invention to prepare an improved plastic resinous film for use in packaging and other applications, with the improved film combining the features of biodegradability with a vapor phase corrosion inhibitor for protection of metallic surfaces held or contained within the film.

It is a further object of the present invention to prepare improved plastic resin films for a variety of applications, the film combining the features of biodegradability and corrosion protection, and wherein the films possess higher breathability and moisture permeability when compared with films created from traditional polyolefin resins.

Other and further objects of the present invention will become apparent to those skilled in the art upon a study of the following specification and appended claims.

DESCRIPTION OF THE PREFERRED EMBODIMENT

In accordance with the preferred embodiment of the present invention, biodegradable film/vapor phase corrosion inhibiting blends are prepared for extrusion to produce films containing the desirable combination of properties set forth above. In order to describe the features of the preferred and other embodiments, the following specific examples are given.

The VCI Component

The selected corrosion inhibiting chemicals suitable for preparing the masterbatch used in the above examples may alternatively be selected from alkali molybdates, amine salts, ammonium benzoate, triazole compounds and derivatives, alkali nitrites, alkali dibasic acid salts, and mixtures thereof. Preferred mixtures having the following formulations may be advantageously employed:

| FORMULATION 1 | |
|---|---|
| Component | Parts by Weight Range |
| Sodium molybdate | 65–70 parts |
| Benzotriazole | 20–25 parts |
| Dicyclohexylammonium nitrite | 5–10 parts. |

| FORMULATION 2 | |
|---|---|
| Component | Percent by Weight Range |
| Benzotriazole | 25–30% |
| Sodium molybdate | 60–65% |
| Sodium nitrite | 3–5% |
| Dicyclohexylammonium nitrite | 3–5%. |

| FORMULATION 3 | |
|---|---|
| Component | Percent by Weight Range |
| Cyclohexylammonium benzoate | 25% |
| Ethanol ammonium benzoate | 5% |
| Benzotriazole | 6% |
| Sodium Sebacate | 60% |
| Sodium Nitrite | 4% |

| FORMULATION 4 | |
|---|---|
| Component | Percent by Weight Range |
| Benzotriazole | 5–10% |
| Sodium sebacate | 55–65% |
| Ammonium benzoate | 15–25% |
| Silica | 0–5% |
| Dicyclohexylammonium nitrite | 5–10% |
| Sodium molybdate | 5–10%. |

Formulations 1–4 are suitable for preparing a masterbatch that can be diluted with suitable polyesters at a ratio of about 15 parts masterbatch and 85 parts polyester resin. Films made from masterbatches 1, 2, 3, and 4 pass the ASTM tests for biodegradability and composting. Films made from a masterbatch prepared with Formulation 3 will also pass the proposed European standard made public on Dec. 8, 1998 as PPEN 13427. This proposed standard prohibits heavy metals.

EXAMPLE I

A resin blend of a "TONE" polymer, commercially available from Union Carbide under the trade designation "P-787" is extruded with selected vapor corrosion inhibitors to produce a masterbatch of about 15% VCI, balance polymer. This masterbatch is further blended with P-787 (polycaprolactone) to produce a composition that can be extruded as a film, molded into selected shapes or mixed with blowing agents to produce contoured shapes suitable for packaging. The film, extruded articles and foams are especially useful in packaging and protecting metallic components.

EXAMPLE II

A resin blend of a polyester prepared from succinic acid, adipic acid and butanediol, commercially available as "3001" from Showa Denko of Japan under the trade designation "Bionolle", is extruded with selected VCI to produce a masterbatch of about 15% VCI, balance polyester. This masterbatch is further blended with more of this polyester and extruded as a film. Films made with this resin have a higher softening point and find utility where more heat resistance is needed.

EXAMPLE III

Suitable biodegradable VCI films can also be obtained by blending VCI powders at the input feed throat of a film extruder.

Three parts of Formulation 3 were added to 97 parts of Bionolle 3001 by feeding the resin and powder directly into the film extrusion feed throat. The feed throat feeds the screw to the heating barrel which produces a viscous melt that is pushed into the forming die from which the blown film is extruded.

The film produced by this process may need a higher percentage of VCI powders to produce an effective level of corrosion inhibition as contrasted to the masterbatch process which ensures a better dispersion of the powders.

EXAMPLE IV

A suitable biodegradable VCI film was prepared by coating a film with a water based solution of a resin and VCI chemical. One mil Bionolle 3001 film was coated with 3 to 5 grams per square meter with a formulation of VCI inhibitors in an acrylic latex:

| Component | Parts by Weight |
| --- | --- |
| Cyclohexylammonium benzoate | 15 parts |
| Ethanolammonium benzoate | 3 parts |
| Ammonium benzoate | 10 parts |
| Triethanolammonium nitrate | 5 parts |
| Benzotriazole | 3 parts |
| Polyacrylic resin latex | 17 parts |
| Water | 47 parts. |

The coated film provided a very effective means of providing VCI vapors and protecting metallic articles enclosed therein.

As a further example of utility, the resin blend of either of Examples I through IV hereinabove may be further blended with a blowing agent in order to form shaped articles such as shaped foams or films including bubble films containing vapor phase corrosion inhibitors. Such foam or shape find utility in packing applications.

By way of summary, therefore, the present invention provides a basis for the utilization of a highly desirable more ecologically friendly biodegradable products which, when utilized, enhance the effectiveness of the products for use in the protection of metallic surfaces. Films prepared in accordance with the present invention provide a mechanism for protecting metallic surfaces against the potential deleterious effects of pro-oxidants present in the structure of most biodegradable plastic resin films. It will be further appreciated that the specific examples given herein are provided for purposes of illustration and for demonstrating the preferred manner of utilization of the features of the present invention. Therefore, these examples are illustrative of the present invention and are riot deemed to be a limitation upon the scope to which the invention is otherwise entitled.

What is claimed is:

1. In biodegradable resin products consisting essentially of polymeric resins selected from the group consisting of polyesters of polylactic acid and polycaprolactone, copolymer blends of polyesters prepared from reactant blends of butanediol, adipic acid, succinic acid, and terephthalic acid, and wherein a particulate vapor phase corrosion inhibitor is dispersed within the resin product, the combination being characterized in that:

(a) said vapor phase corrosion inhibitor is selected from amine salts, ammonium benzoate, triazole derivatives, alkali dibasic acid salts, alkali nitrites, tall oil imidazolines, alkali metal molybdates, and mixtures thereof, and is present in an amount ranging up to 25% by weight of the polymeric resin;

(b) said biodegradable resin products being further blended with a suitable polymeric resin to provide finished products containing between 1% and 3% vapor phase corrosion inhibitor.

2. The biodegradable resin corrosion inhibitor masterbatch as described in claim 1.

3. The biodegradable resin product as defined in claim 1 being particularly characterized in that said resin product is extruded into a film form containing up to 3% VCI.

4. The biodegradable resin masterbatch product and film as described in Formulation 3.

5. The coated biodegradable resin films as described in claims 1 and 4.

6. The biodegradable resin product as defined in claim 1 being particularly characterized in that said resin product is formed into a shaped articles containing up to 3% VCI.

7. The biodegradable resins of claim 1 being blended with blowing agents to produce shaped forms or film foam products such as bubble films containing vapor phase corrosion inhibitors.

8. The process of preparing a biodegradable resin film consisting essentially of a polymeric resin film selected from the group consisting of polyester polymers of polylactic acid and polycaprolactone, which comprises the steps of:

(a) extruding a blend of suitable polyester resins and selected corrosion inhibitors in a ratio of about 88 parts resin and 12 parts vapor corrosion inhibitors;

(b) preparing a blend of said particulate masterbatch and said biodegradable resin film wherein said vapor phase corrosion inhibitor comprises between 1% and 3% by weight of said polymeric resin; and (c) extruding said blend and orienting the extrudate to form a film having a thickness of between about 1 mil and 10 mils.

9. The process of preparing a film suitable for inhibiting corrosion as follows:

(a) polyester pellets of Bionolle and other suitable biodegradable resins are blended with a mixture of corrosion inhibiting powders in a ratio of 98 parts resin and 2 parts powder by feeding the powders directly into film extrusion feed throat, with said feed throat feeding the screw to a heating barrel to produce a viscous melt which is thereafter pushed into a forming die for producing a film.

* * * * *